US 10,800,443 B2

(12) United States Patent
Klein et al.

(10) Patent No.: US 10,800,443 B2
(45) Date of Patent: Oct. 13, 2020

(54) CATCH MOTOR TORQUE GENERATION IN STEER BY WIRE SYSTEM

(71) Applicant: STEERING SOLUTIONS IP HOLDING CORPORATION, Saginaw, MI (US)

(72) Inventors: Steven D. Klein, Munger, MI (US); Kai Zheng, Midland, MI (US); Scott T. Sanford, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 212 days.

(21) Appl. No.: 16/134,132

(22) Filed: Sep. 18, 2018

(65) Prior Publication Data
US 2019/0084611 A1    Mar. 21, 2019

Related U.S. Application Data

(63) Continuation of application No. 62/561,267, filed on Sep. 21, 2017.

(51) Int. Cl.
*B62D 5/00* (2006.01)
*B62D 5/04* (2006.01)
*B62D 6/00* (2006.01)

(52) U.S. Cl.
CPC ............ *B62D 5/006* (2013.01); *B62D 5/001* (2013.01); *B62D 5/0442* (2013.01); *B62D 5/0481* (2013.01); *B62D 6/008* (2013.01)

(58) Field of Classification Search
CPC ........ B62D 5/006; B62D 6/008; B62D 5/001; B62D 5/0442; B62D 5/0481; B62D 5/003; B62D 5/005
See application file for complete search history.

(56) References Cited

U.S. PATENT DOCUMENTS

| 5,198,981 A | 3/1993 | Collier-Hallman et al. |
| 5,704,446 A | 1/1998 | Chandy et al. |

(Continued)

OTHER PUBLICATIONS

Varunjikar, Tejas, "Design of Horizontal Curves with Downgrades Using Low-Order Vehicle Dynamics Models," A Thesis in Mechanical Engineering, The Pennsylvania State University, The Graduate School Department of Mechanical Engineering, May 2011, pp. 1-141, University Park, Pennsylvania.

*Primary Examiner* — Basil T. Jos
(74) *Attorney, Agent, or Firm* — Dickinson Wright PLLC

(57) ABSTRACT

According to one or more embodiments described herein, a steer by wire steering system includes a pair of actuators, a handwheel actuator that provides a commanded position to a roadwheel actuator, which moves a rack of the vehicle to a rack position based on the commanded position from the handwheel actuator. The steer by wire steering system further includes a controller that generates a handwheel torque command, the handwheel actuator generates a feedback torque based on the handwheel torque command. The controller further computes a tracking error based on a difference between the commanded position and the rack position. The controller further determines a catch motor torque value using the tracking error. The controller further modifies the handwheel torque command using the catch motor torque, the handwheel actuator generates an amount of torque that is substantially a sum of the feedback torque and the catch motor torque.

20 Claims, 3 Drawing Sheets

(56) References Cited

U.S. PATENT DOCUMENTS

| | | |
|---|---|---|
| 6,370,460 B1 | 4/2002 | Kaufmann et al. |
| 6,625,530 B1 | 9/2003 | Bolourchi |
| 7,512,468 B2 | 3/2009 | Tamaizumi et al. |
| 2003/0060955 A1 | 3/2003 | Suissa |
| 2004/0088093 A1* | 5/2004 | Yao .................. B62D 6/008 |
| | | 701/44 |
| 2005/0256620 A1 | 11/2005 | Kato et al. |
| 2014/0257641 A1 | 9/2014 | Champagne et al. |
| 2015/0367884 A1 | 12/2015 | George et al. |
| 2016/0264172 A1 | 9/2016 | Oiki et al. |
| 2016/0272197 A1 | 9/2016 | Hulten et al. |
| 2016/0280251 A1 | 9/2016 | George et al. |
| 2017/0203785 A1 | 7/2017 | Naik et al. |
| 2017/0232998 A1 | 8/2017 | Ramanujam et al. |

* cited by examiner

CATCH MOTOR TORQUE GENERATION IN STEER BY WIRE SYSTEM

CROSS-REFERENCE TO RELATED APPLICATION

This application claims priority of U.S. Provisional Application No. 62/561,267, filed Sep. 21, 2017, which is incorporated in its entirety herein.

BACKGROUND

An electric power steering (EPS) typically includes components such as steering wheel, column, rack-pinion gear, electric motor actuator etc. The EPS helps the driver to steer a vehicle by providing necessary torque assist. The assist torque is based on driver's applied torque. In a steady-state sense, the driver torque and assist torque counter the rack force generated because of tire-road interaction.

A typical steer by wire (SbW) system includes a roadwheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the driver. Alternatively, the handwheel angle and vehicle speed can also be used to generate desired torque feel to the driver. The angle from HWA unit is sent to the RWA unit which performs position control to control rack travel.

SUMMARY

According to one or more embodiments, a steer by wire steering system includes a handwheel actuator that provides a commanded position to a roadwheel actuator of a vehicle. The steer by wire steering system further includes the roadwheel actuator that moves a rack of the vehicle to a rack position based on the commanded position from the handwheel actuator. The steer by wire steering system further includes a controller that generates a handwheel torque command, the handwheel actuator generates a feedback torque based on the handwheel torque command. The controller further computes a tracking error based on a difference between the commanded position and the rack position. The controller further determines a catch motor torque value using the tracking error. The controller further modifies the handwheel torque command using the catch motor torque, the handwheel actuator generates an amount of torque that is substantially a sum of the feedback torque and the catch motor torque.

According to one or more embodiments, a method for a steer by wire steering system includes sending, by a handwheel actuator, a commanded position for receipt by a roadwheel actuator. The method further includes positioning, by the roadwheel actuator, a rack to a rack position based on the commanded position. The method further includes generating, by the handwheel actuator, a feedback torque based on a handwheel torque command, the feedback torque corresponding to one or more forces acting on the rack. The method further includes computing, by a controller, a tracking error based on a difference between the commanded position and the rack position. The method further includes determining, by the controller, a catch motor torque value using the tracking error. The method further includes modifying the handwheel torque command using the catch motor torque, the handwheel actuator generates an amount of torque that is substantially a sum of the feedback torque and the catch motor torque.

According to one or more embodiments a computer program product includes a memory storage device having computer executable instructions stored therein, the computer executable instructions when executed by one or more processing units cause the processing units to adjust a feedback torque generated by a steer by wire steering system. Adjusting the feedback torque includes generating, by a handwheel actuator, the feedback torque based on a handwheel torque command, the feedback torque corresponding to one or more forces acting on a rack of a vehicle. Adjusting the feedback torque further includes computing a tracking error based on a difference between a commanded position from the handwheel actuator and a rack position. Adjusting the feedback torque further includes determining a catch motor torque value using the tracking error. Adjusting the feedback torque further includes modifying the handwheel torque command using the catch motor torque, causing the handwheel actuator to generate an amount of torque that is substantially a sum of the feedback torque and the catch motor torque.

These and other advantages and features will become more apparent from the following description taken in conjunction with the drawings.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for a SbW system to provide synchronous responses to steering maneuvers performed by an operator of a vehicle.

Figure 1:
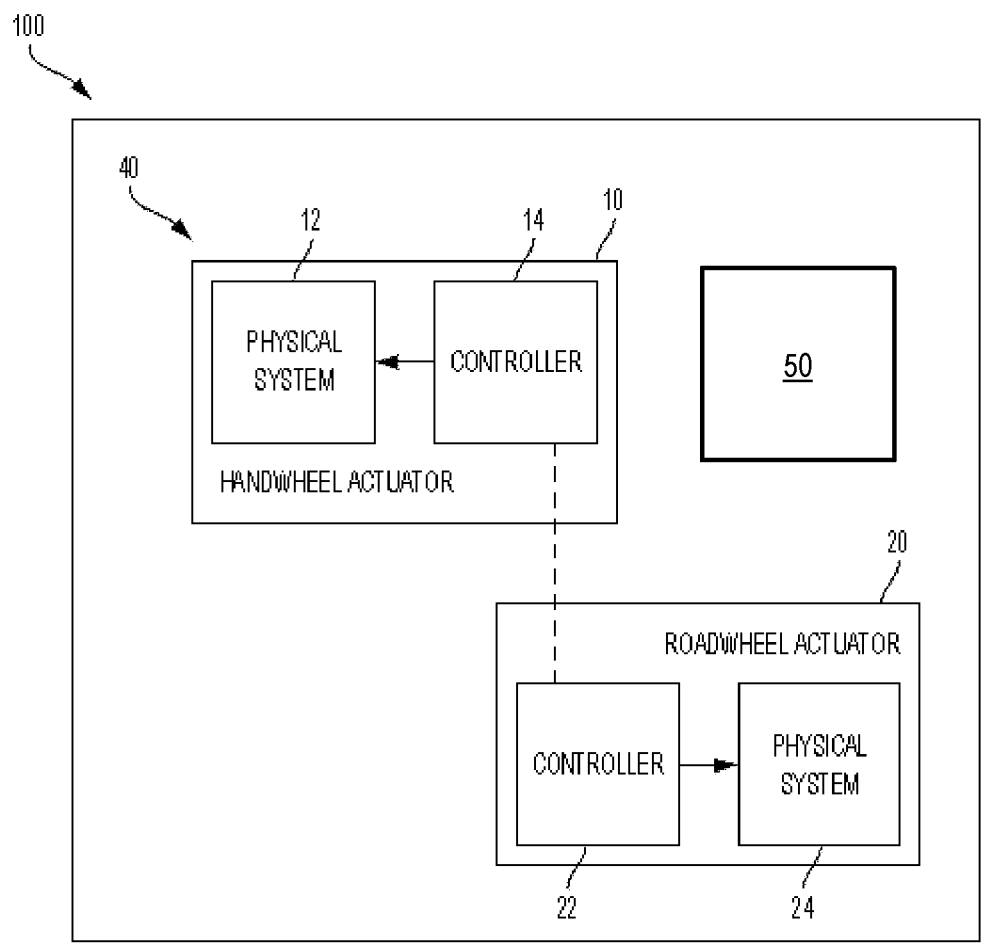
FIG. 1 is an exemplary embodiment of a steer by wire steering system according to one or more embodiments.

Referring now to the Figures, where the invention will be described with reference to specific embodiments, without limiting same, a SbW system 40 in a vehicle 100 is depicted in FIG. 1. It will be appreciated that the SbW system 40 shown and described can be used in an autonomous or semi-autonomous vehicle or in a more conventional vehicle. It is understood that the SbW system 40 depicted is an exemplary block diagram and that in one or more embodiments, the SbW system 40 can include addition components than those depicted here. The SbW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 24, such as a steering rack and/or pinion coupled to a motor/inverter through a ball-nut/ball-screw (gear) arrangement, and the rack is connected to the vehicle road wheels/tires through tie-rods. Accordingly, the physical system 24 can include one or more road wheels of the vehicle 100. The RWA 20 includes a microcontroller 22 that controls the operation of the mechanical components 24. The microcontroller 22 receives and/or generates torque via the one or more mechanical components 24.

The microcontrollers 14 and 22 are coupled through electrical connections that allow signals to be transmitted/received. As referred to herein, a controller can include a combination of the HWA controller 14 and the RWA controller 22, or any one of the specific microcontrollers.

In one or more examples, the controllers 14 and 22 SbW system 40 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator. The RWA 20 receives an electronic communication signal of rotation of the steering wheel by the driver. A driver controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 10 that is coupled to the steering column and steering wheel simulates the driver's feel of the road. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

The HWA 10 and the RWA 20 typically have a 'steering ratio' that determines how much the roadwheel changes position when a change in position is made in the handwheel of the SbW system 40. In a steering system that has a mechanical linkage between the handwheel and the roadwheel, a gear maintains this ratio. In the SbW system 40, the steering ratio is a predetermined value. However, in the SbW system 40, it is possible that the desired steering ratio may not be maintained at all times. There are several common situations that might cause this to occur. Examples include exceeding the velocity capability of the RWA 20 during a rapid driver input, handwheel angle input requiring roadwheel actuation past a travel stop, excess load on the RWA 20 (above a predetermined maximum threshold), initialization issues, and the like.

Not achieving the desired steering ratio has a number of undesired effects in the vehicle 100. Probably the biggest negative effect is that the SbW system 40 continues trying to move the roadwheel according to the desired steering ratio after the driver ceases to actuate the handwheel. This causes a significant lag in the vehicle 100 response and can make it appear that the vehicle 100 has continued to steer by itself.

Because the two systems, the HWA 10 and the RWA 20, are not linked mechanically, the lag between the two systems can result in an error to exist between the desired steering angle of the driver and the actual steering angle at the road wheels. This error can be generated by the driver steering the HWA 10 quicker than a capability of the RWA 20 to steer the road wheels, or the error can exist due to a fault condition of one or both systems. When such a condition occurs, the lag in vehicle response is generated, that is the vehicle 100 does not follow the input of the operator. This can cause the operator to feel 'disconnected' from the road. The technical solutions described herein address such technical challenges and facilitate keeping the operator input in-synch with the vehicle response.

In hydraulic power steering systems (HPS) and electric assist-based steering (EPS) systems, the operator is mechanically linked to the road wheels of the vehicle, unlike the SbW system 40. When the HPS system or the EPS system can no longer provide enough assist to keep up with the driver's input, the steering efforts become much higher. This is typically described as 'catch' or 'catch-up' condition, when the driver's input exceeds the capability of the assist system. The condition in which 'catch' occurs depends on steering velocity and load. The load depends on many conditions such as vehicle speed, payload, tire inflation, road surface friction coefficient ($\mu$), etc.

Existing techniques to address such technical challenges include SbW systems simulating the 'catch' condition by slowing the operator by programming a damping term into the HWA 10. While this can slow the driver's inputs, it does not represent the actual driving conditions or system capability. The one or more embodiments of the technical solutions described herein address overcome such deficiencies in the existing techniques and accordingly provide an improved catch motor torque generation to simulate the catch condition in the SbW system 40.

Figure 2:
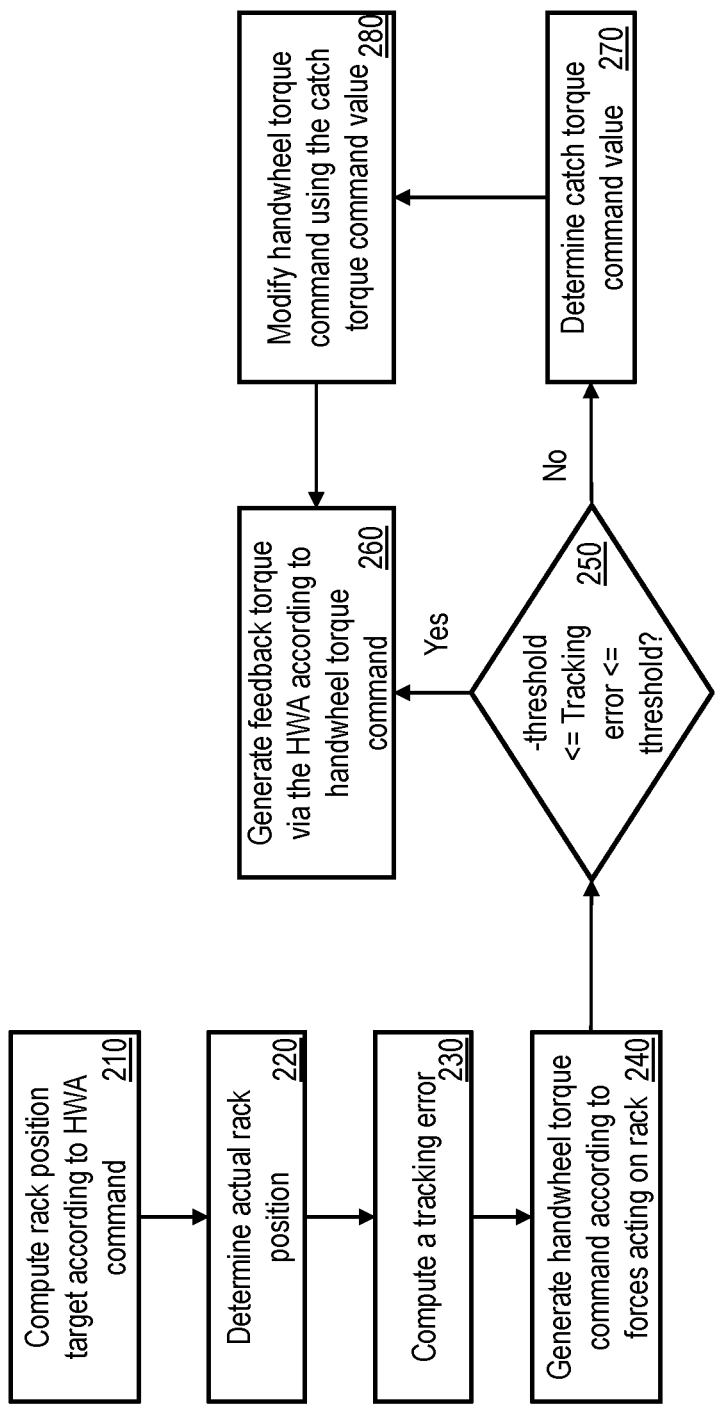
FIG. 2 depicts a flowchart of an example method for generating catch motor torque according to one or more embodiments.

FIG. 2 depicts a flowchart of a method for generating a catch motor torque for a SbW system according to one or more embodiments. The method includes receiving a commanded position from the HWA 10, at 210. The commanded position is based on an input torque provided by the operator via the physical system 12, such as via the steering wheel. The commanded position is indicative of a desired position of the rack (physical system 24) based on a steering ratio between the HWA 10 and the RWA 20.

The method further includes receiving the actual position of the rack, at 220. The actual position may be measured using a sensor. The actual position can be different than the commanded position for various reasons described herein, such as a physical limit of where the rack can be positioned, physical limit of the steering wheel, etc.

The method includes computing a tracking error using the commanded position and the actual position, at 230. In one or more examples, the tracking error is computed by determining a difference between the commanded position and the actual position.

The method further includes generating a handwheel torque command according to forces acting on rack and other components of the physical system 24, at 240. As described earlier, the handwheel torque command provides the feedback because of the road surface or any other physical force acting on the physical system 24.

The tracking error is compared with a predetermined threshold value, at 250. If the tracking error is below (or equal to) the predetermined threshold value, the handwheel torque command is sent to the HWA 10, which generates a corresponding amount of feedback torque for the operator, at 260. The feedback torque increases the resistance felt by the operator when maneuvering a steering wheel or any other type of direction input device of the vehicle 100.

Alternatively, if the tracking error exceeds the predetermined threshold, at 250, the catch motor torque is computed, at 270. The catch motor torque is computed based on the tracking error. In one or more examples, a value/amount of catch motor torque that is to be generated is determined based on a look up table (Table 1). It is understood that the values and units shown in Table 1 are exemplary and that in other examples, the values can be different. The look up table can be based on a predetermined relationship between the tracking error and the catch motor torque. In one or more examples, the relationship can be non-linear. In one or more examples, the catch motor torque is computed dynamically based on a function representing the relationship between the catch motor torque and the tracking error. The dynamic computation uses the computed tracking error as an input parameter.

| Tracking error (mm) | 0 | 1 | 2 | 5 | 7 |
|---|---|---|---|---|---|
| Catch Motor Torque (HwNm) | 0 | 1 | 2 | 6 | 10 |

Figure 3:
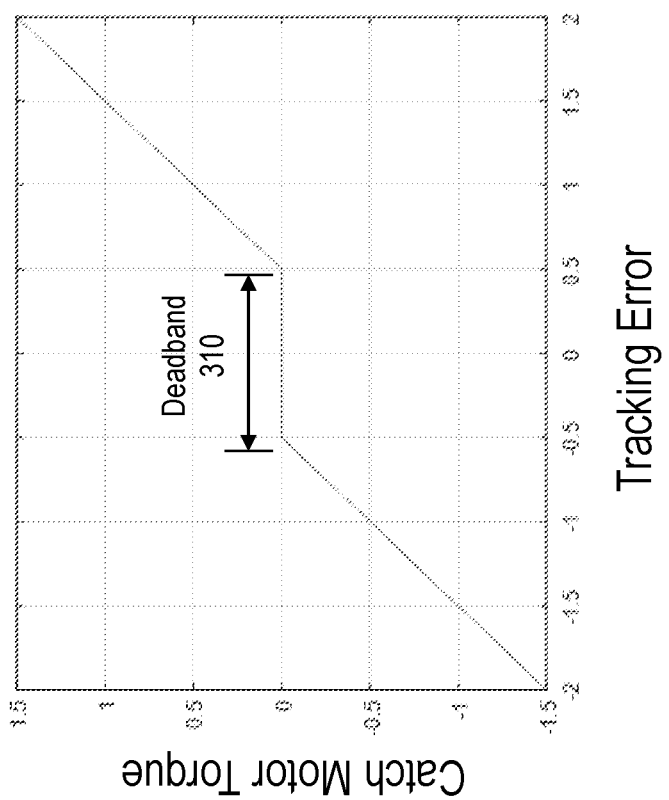
FIG. 3 depicts an illustration of the "deadband" being applied in an example scenario according to one or more embodiments.

In one or more examples, the tracking error is compared with the threshold to generate the catch motor torque so as to apply a "deadband" to ensure that the SbW system 40 does not react to relatively small deviations in the tracking correlation between the HWA 10 and the RWA 20. The predetermined threshold determines how small the deviations can be before the handwheel torque command is modified. FIG. 3 depicts an illustration of the "deadband" being applied in an example scenario. Here, the tracking error between the range ±0.5 does not cause a catch motor torque to be generated (region 310 in the plot). For all other values of the tracking error, a corresponding catch motor torque is generated, in this case using a linear function of the tracking error. It is understood that the function can be different, and/or non-linear in other examples. Accordingly, the catch motor torque is determined in response to the tracking error being in a predetermined range of values. The function can also be dynamic in the sense that its input variable can also include time. One specific example is using a low pass filter in conjunction with linear/nonlinear static function. The low pass filter can reduce noise in catch motor torque due to noise in tracking error.

The catch motor torque added into the handwheel torque command provides the operator an increased resistance when maneuvering the SbW system 40. Accordingly, the operator has to provide an increased effort to maneuver the SbW system 40 because of the catch motor torque compared to the effort required to overcome the feedback torque corresponding to one or more forces acting on the rack of the vehicle. The catch motor torque is capped at a predetermined maximum value to limit the additional effort that the operator has to provide.

Now referring to FIG. 2, the method further includes adding the computed catch motor torque in the feedback torque that is to be generated by the HWA 10, at 280. Accordingly, the handwheel torque command is modified to add a catch motor torque command, which is generated based only on the amount of catch motor torque. The modified handwheel torque command is subsequently sent to the HWA 10, for generating the feedback torque, at 260.

The above method can be implemented by the controller 14 of the HWA 10 or by the controller 24 of the RWA 20. Alternatively, or in addition, the controllers 14 and 24 can implement the catch motor torque generation method by working in conjunction.

Alternatively, or in addition, a separate catch motor torque module 50 (see FIG. 1) generates the catch motor torque. The catch motor torque module 50 can be coupled with the controller 14 and/or the controller 24 to receive one or more input values for generating the catch motor torque.

It should be noted that while the description herein uses a position of the rack to explain one or more embodiments, in other embodiments the position that is used may be a road wheel position or a position associated with any other component that is controlled by the RWA 20.

The one or more embodiments of the technical solutions described herein facilitate slowing the operator's inputs to a SbW system only during the conditions in which the RWA cannot honor the position as commanded by the HWA. There are a number of conditions that may cause the RWA to not keep up with the commanded position, as described herein; regardless of the cause the end result is an increase in the road wheel position tracking error. The road wheel position tracking error is the difference between a target road wheel position and an actual road wheel position).

The technical solutions described herein use the road wheel position tracking error to trigger simulating the "catch" effect.

The one or more embodiments of the technical solutions described herein facilitate causing the operator to provide additional steering effort when a steering wheel outruns road wheel in a SbW system. The technical solutions described herein simulate the missing mechanical linkage between steering wheel and road wheel in a SbW system.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A steer by wire steering system comprising:
   a handwheel actuator that provides a commanded position to a roadwheel actuator of a vehicle;
   the roadwheel actuator that moves a rack of the vehicle to a rack position based on the commanded position from the handwheel actuator; and
   a controller configured to:
   generate a handwheel torque command, the handwheel actuator generates a feedback torque based on the handwheel torque command;
   compute a tracking error based on a difference between the commanded position and the rack position;

determine a catch motor torque value using the tracking error; and modify the handwheel torque command using the catch motor torque, the handwheel actuator generates an amount of torque that is substantially a sum of the feedback torque and the catch motor torque.

2. The steer by wire steering system of claim 1, wherein the controller sends the handwheel torque command to the handwheel actuator, which generates the amount of torque at a steering wheel.

3. The steer by wire steering system of claim 1, wherein the controller determines the catch motor torque in response to the tracking error exceeding a predetermined threshold.

4. The steer by wire steering system of claim 1, wherein the controller determines the catch motor torque in response to the tracking error being in a predetermined range of values.

5. The steer by wire steering system of claim 1, wherein the catch motor torque is determined using the tracking error based on a look up table.

6. The steer by wire steering system of claim 1, wherein the catch motor torque causes an operator of the steer by wire system to provide increased effort to maneuver the steer by wire system.

7. The steer by wire steering system of claim 1, wherein catch motor torque is limited to a predetermined maximum value.

8. The steer by wire steering system of claim 1, wherein the controller is part of the handwheel actuator.

9. The steer by wire steering system of claim 1, wherein the controller is part of the roadwheel actuator.

10. A method for a steer by wire steering system, the method comprising:

sending, by a handwheel actuator, a commanded position for receipt by a roadwheel actuator;

positioning, by the roadwheel actuator, a rack to a rack position based on the commanded position;

generating, by the handwheel actuator, a feedback torque based on a handwheel torque command, the feedback torque corresponding to one or more forces acting on the rack;

computing, by a controller, a tracking error based on a difference between the commanded position and the rack position;

determining, by the controller, a catch motor torque value using the tracking error; and modifying the handwheel torque command using the catch motor torque, the handwheel actuator generates an amount of torque that is substantially a sum of the feedback torque and the catch motor torque.

11. The method of claim 10, wherein the controller determines the catch motor torque in response to the tracking error exceeding a predetermined threshold.

12. The method of claim 10, wherein the catch motor torque is determined using the tracking error based on a look up table.

13. The method of claim 10, wherein the catch motor torque causes an operator of the steer by wire system to provide increased effort to maneuver the steer by wire system.

14. The method of claim 10, wherein catch motor torque is limited to a predetermined maximum value.

15. A computer program product comprising a memory storage device having computer executable instructions stored therein, the computer executable instructions when executed by one or more processing units cause the processing units to adjust a feedback torque generated by a steer by wire steering system, the adjusting comprising:

generating, by a handwheel actuator, the feedback torque based on a handwheel torque command, the feedback torque corresponding to one or more forces acting on a rack of a vehicle;

computing a tracking error based on a difference between a commanded position from the handwheel actuator and a rack position;

determining a catch motor torque value using the tracking error; and modifying the handwheel torque command using the catch motor torque, causing the handwheel actuator to generate an amount of torque that is substantially a sum of the feedback torque and the catch motor torque.

16. The computer program product of claim 15, wherein the catch motor torque is determined in response to the tracking error exceeding a predetermined threshold.

17. The computer program product of claim 15, wherein the catch motor torque is determined using the tracking error based on a look up table.

18. The computer program product of claim 15, wherein the catch motor torque causes an operator of the steer by wire system to provide increased effort to maneuver the steer by wire system.

19. The computer program product of claim 15, wherein catch motor torque is limited to a predetermined maximum value.

20. The computer program product of claim 15, wherein the catch motor torque is determined in response to the tracking error being in a predetermined range of values.

* * * * *